United States Patent [15] 3,648,255
Beausoleil et al. [45] Mar. 7, 1972

[54] AUXILIARY STORAGE APPARATUS

[72] Inventors: William F. Beausoleil, Poughkeepsie, N.Y.; Fred A. Ordemann, Jr., San Jose, Calif.; Wilbur D. Pricer, Poughkeepsie, N.Y.; Norbert G. Vogl, Jr., Essex Junction, Vt.

[73] Assignee: International Business Machines Corporation, Armonk, N.Y.

[22] Filed: Dec. 31, 1969

[21] Appl. No.: 889,435

[52] U.S. Cl. .......... 340/172.5
[51] Int. Cl. .......... G06f 7/34
[58] Field of Search .......... 340/172.5, 173 A

[56] References Cited

UNITED STATES PATENTS 3,435,423 3/1969 Fuller et al. .......... 340/172.5
3,471,835 10/1969 Gribble et al. .......... 340/172.5
3,441,912 4/1969 Henle .......... 340/172.5
3,340,514 9/1967 Swift .......... 340/172.5
3,388,383 7/1968 Shivdasani et al. .......... 340/172.5
3,478,325 11/1969 Oeters et al. .......... 340/172.5

*Primary Examiner*—Paul J. Henon
*Assistant Examiner*—Mark Edward Nusbaum
*Attorney*—Hanifin and Jancin and Owen L. Lamb

[57] ABSTRACT

An electronic bulk storage having the characteristics of a sequential access storage device, such as a disk or a drum, but which has a low-access time and a variable instantaneous data rate. Data re stored parallel by word in a plurality of electronically rotatable memory elements selectable by a memory selection matrix. Each element has a feedback loop for recirculating data and when selected, a group of elements is read or written in parallel to a word at a time by electronically rotating the selected memory elements.

34 Claims, 9 Drawing Figures

INVENTORS
WILLIAM F. BEAUSOLEIL
FRED A. ORDEMANN JR
WILBUR D. PRICER
NORBERT G. VOGL JR

BY Owen Lamb
ATTORNEY

Patented March 7, 1972 3,648,255

7 Sheets-Sheet 5

FIG. 7
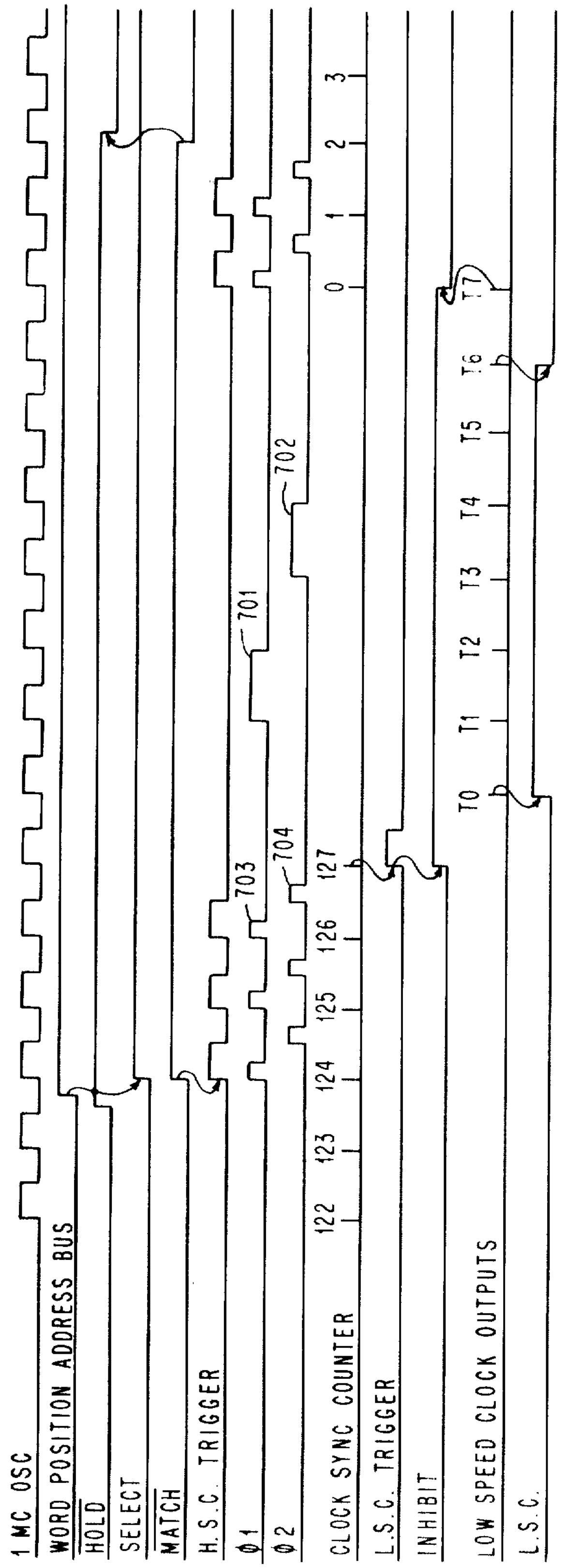
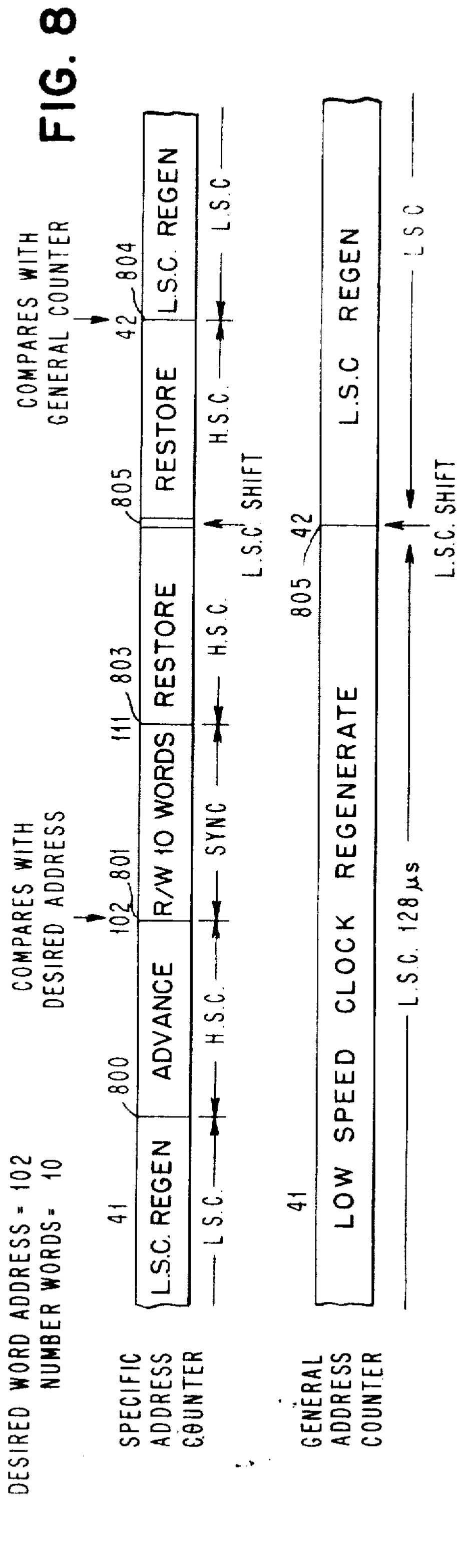

AUXILIARY STORAGE APPARATUS

BACKGROUND OF THE INVENTION

The invention relates to auxiliary storage devices for use with a data processing system.

The overall performance of data processing systems is greatly improved with improved access to intermediate storage, i.e., systems resident programs, most frequently used information, data sets or application programs. At present, the most popular devices for storing such data and programs are direct access storage devices such as disks or drums. These are mechanical devices whose technology has been pushed to its physical limits in order to increase their effectiveness on systems throughput. The fastest of mechanical access devices can access data in milliseconds. The slowest large capacity random access core storage operates in tens of microseconds leaving a large access-time/price gap in the storage hierarchy spectrum.

Fast-access magnetic core memories have the advantage that they are not overrunnable, that is, data are accessed from the memory on a demand basis by the user by sequentially addressing the memory locations at the instantaneous data rate of the apparatus using the data. However, on mechanical storage devices, once the device is set in motion all of the data stored at the address location must be read and provision must be made to buffer the data if a change in data rate is necessary. On sequential access devices such as disks and drums, the data cannot be read until the desired data reaches the read/write head. The access time is in the order of tens of milliseconds compared to access times in the order of microseconds for the invention herein disclosed.

Memories utilizing seimconductor devices offer random access memory of higher speed than mechanical devices and lower speed than magnetic cores, however, these devices are relatively expensive for bulk memory system application.

SUMMARY OF THE INVENTION

It is a primary object of this invention to provide a bulk storage with low cost, low access time and improved performance.

It is also an object of this invention to provide a fast sequential access storage device without electromechanical means and having a variable speed data transfer rate.

It is a further object of this invention to provide a non-overrunnable electronic storage having the characteristics of a sequential access storage device but which can vary its instantaneous data rate.

Briefly, the above objects are accomplished in accordance with the invention by providing a nonmechanical storage device employing electronically rotatable memory elements which operate in conjunction with timing means and data access controls to provide a variable instantaneous data rate.

A synchronous data transfer results which allows an external data source to lock in on block transfers, there being no additional rotation between blocks (because the device is electronic rather than mechanical).

In accordance with one aspect of the invention, an inherent characteristic of the memory elements is that data are stored therein on a temporary basis and must be regenerated periodically. In accordance with this aspect of the invention, timing means are provided comprising a high speed clock operating in conjunction with a low speed clock. Circuits are provided for selecting a particular memory element within a group of elements including rotating the selected elements at a higher speed under control of the high speed clock while the remainder of the elements are "regenerated" at slow speed by the low speed clock. More specifically, in accordance with an aspect of the invention, a plurality of multibit electronically rotatable memory elements are arranged in columns and rows in memory planes, one plane for each bit position of a word. Address decoding means are provided for selecting a column and a row to thereby select one memory element location on each plane. Means are provided for electronically rotating bits stored in the selected memory elements in unison to thereby read out words in parallel, each bit of a word being read out from a corresponding memory plane.

In accordance with an aspect of the invention, a specific address counter is provided for maintaining a position count of the contents of the memory elements as they are rotated. A particular word is located by comparing the address of the particular word (word position address) with the state of the counter. When the two compare, the word corresponding to the word position address appears at the output of the selected memory elements.

In accordance with another aspect of the invention, the word position address of the first word of a block of words is presented to the comparator and the bits stored in the selected memory elements are electronically rotated at high speed until the specific address counter matches the word position address at which time the read operation is initiated. Successive words are read by incrementing the word position address and electronically rotating the bits stored in the selected memory elements one word position at a time.

The invention has the advantage that the memory elements when selected are electronically similar to a drum, the instantaneous data rate of which can be varied. This allows the data to be read in parallel by word in synchronism with the operating rate of the apparatus to which the data is transferred. This eliminates the need to buffer data.

In a preferred embodiment of this invention, dynamic shift registers employing field effect transistors (FET) are used to implement the memory element. The operation of a FET dynamic shift register requires either charging or discharging a capacitance by a clock in accordance with the information stored in a previously charged capacitance in a prior stage of the shift register. The field effect transistor connected as a shift register contains characteristics which make it highly suitable in a large bulk storage of this type. The device has a high input impedance thus avoiding the discharge of the sense capacitance and a high off-to-on impedance ratio so that the shift register is capable of operating over a wide frequency range.

Since information is stored in capacitors, the information will in time decay to a point where it is no longer useful, because of the natural discharge of the capacitance. To avoid this loss of data, the shift registers are periodically pulsed or shifted to regenerate the stored data. This is accomplished by providing a slow speed clock which periodically shifts the bits stored in all of the elements in the memory to thereby regenerate the stored data.

The invention has the advantage that this type of electronic memory can be easily adapted to operate as a direct access storage device and therefore, can be attached to a standard input/output interface and operated in a manner similar to the operation of already existing electromechanical devices.

As an I/O device, the storage is connected to an input/output channel by means of a standard input/output interface or may be integrated with a dedicated channel in which case the storage unit capabilities are optimized.

The invention has the advantage that the input/output throughput in terms of the number of requests per second that can be handled by the system is substantially improved. The access time is approximately 40 times better than the fastest mechanical direct access storage device in existence. The number of program interrupts required to obtain data from an auxiliary storage unit are less because of simplified commands, elimination of mechanical "seek" times (positioning of heads, etc.) and improved access time.

The invention is not limited in scope to I/O devices; the concepts are easily adapted to other storage applications, for example, but not limited to: input/output storage; bulk storage; hierarchy storage; staging; device, terminal, control unit buffering; and communication line multiplexing line matching, etc.

The auxiliary storage unit when used for control unit buffering offers a substantial savings in cost over delay lines and magnetic core buffers. Since most input/output and communications buffering applications are serial in nature and vary over a relatively large speed range, the concepts of the present invention offer a significant performance improvement in this area. For example, keyboard terminals are buffered on a message or line of characters basis. Instead of transmitting a character at a time, blocks of data are transmitted in burst mode thus reducing line contention and facilitating corrections made by the operator prior to entry into the system.

Buffering of format data in graphic systems is presently handled in magnetic core memory areas set aside for this purpose and transmitted to the graphic terminal. By using the present invention, user formats are stored at the terminal thus reducing system overhead.

The foregoing and other objects, features, and advantages of the invention will be apparent from the following more particular description of a preferred embodiment of the invention, as illustrated in the accompanying drawings.

BRIEF DESCRIPTION OF THE FIGURES OF THE DRAWINGS

FIG. 7 is a timing diagram illustrating a typical operation of the storage unit of FIG. 1; and FIG. 8 is a flow chart of a typical data transfer operation.

BRIEF DESCRIPTION OF THE PREFERRED EMBODIMENT

Figure 1:
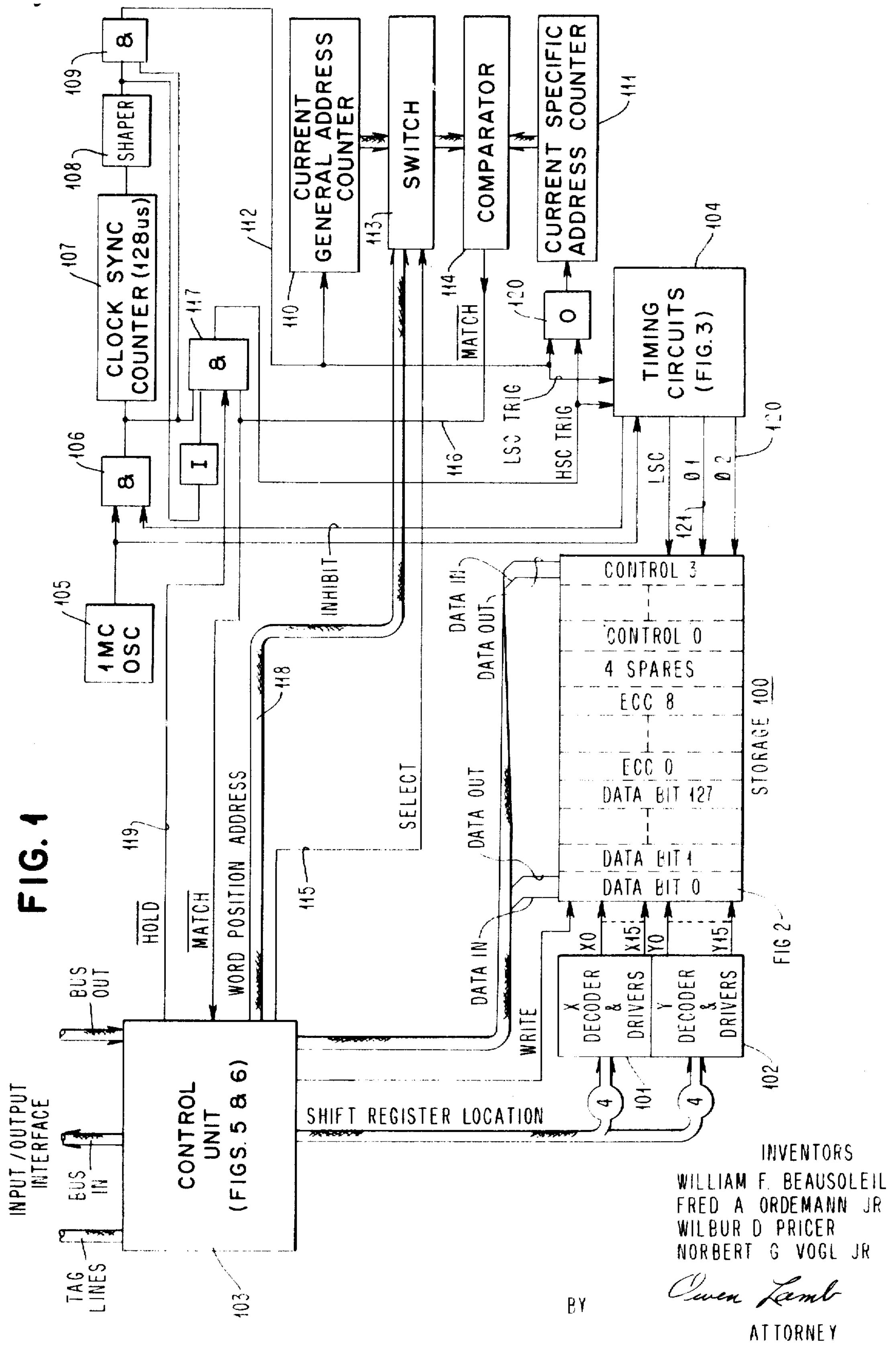
FIG. 1 is a block schematic diagram of an auxiliary storage unit in which the invention is embodied.

Briefly, a preferred embodiment of the invention comprises a bulk storage made up of shift registers arranged in a three dimensional memory matrix. The memory combines the attributes of a random access storage device in which access can be made directly to any storage regardless of its physical position relative to previously referenced information, and the attributes of sequential access storage devices in which information must be accessed sequentially.

Each shift register in the matrix has the capacity to store a plurality of bits, for example, 256 bits. Each shift register can be shifted so that these bits are presented in a serial manner at the output of the shift register. The output of the shift register is fed back to the input to provide a continuous loop of bits shifted in the shift register. Each shift register represents a bit position of a parallel word made up of a plurality of bits. Shift registers are arranged in columns and rows in a memory plane, one shift register per plane being selected at a time by energizing X and Y coordinates to thereby select the shift register at the intersection of the energized coordinates. Each plane therefore represents a bit position of the parallel word. Thus, when the coordinates $X_n$ and $Y_n$ are selected, they select shift register N on the first plane, (the first bit position of the word), shift register N on the second plane, (the second bit position of the word), etc.

Timing circuits are provided for shifting the shift registers and for stepping an address counter which maintains a count of the number of shifts which have taken place to thereby provide an address of the word currently appearing at the output of the shift registers which are selected.

In order to read a particular word from the memory, a position address containing sufficient information to identify the shift registers and the word within the shift registers is presented to the memory. The high order portion of the position address is presented to X and Y decoders wherein the address is decoded to select one X coordinate and one Y coordinate. The shift register at the intersection of the energized X and Y coordinates contains the desired word. The low order portion of the position address contains information identifying the word position within the shift register. This information is provided to a comparator. The shift registers selected by the X and Y coordinates are shifted at high speed by the timing circuit and a count is maintained by the address counter of the position of the shift registers. The output of the address counter is also presented to the comparator. When the selected shift registers have been shifted to the point where the contents of the address counter equal the contents of the word position address, the desired word within the shift registers has been reached and a match signal indicates this fact to a control circuit. The high speed shifting operation is stopped and the data word is read from the memory. If the next sequential word is desired, only the word position address portion of the position address is incremented to thereby shift the shift registers one more position to read the next word from the memory.

In a more specific implementation of the invention, insulated gate field effect transistors (IGFET) are utilized in a shift register arrangement such that information is stored serially within the shift register by means of capacitors between the stages of the shift register. Since the capacitors have a decay time associated with them, eventually the data stored therein will be lost unless the information is periodically regenerated. Regeneration is accomplished by shifting the contents of the shift register one bit position prior to the time that the data stored therein has decayed to a point where it is no longer useful. The output of the shift register is fed back to its input so that the information can be regenerated continuously, if necessary. The regeneration shifting cycle required is very much slower than the rate at which the data is ordinarily shifted for reading and writing purposes. For this reason, a very low speed clock is provided which generates a pulse periodically at slow rates to shift all of the shift registers within the array (whether or not they are selected by the address decoders for reading and writing) to thereby periodically regenerate the data stored therein.

When no use is being made of the memory, the low speed clock regenerates all of the shift registers periodically at low speed. Relatively little power is required to shift at low speeds. A current general address counter is provided to keep track of the relative position of all of the shift registers within the array. Therefore, in its quiescent or nonselected state, the shift registers are all periodically regenerated at slow speed in unison and all of the shift registers are at the position indicated by the current general address counter. In order to read or write data, the addressing means energizes at least one X and at least one Y coordinate to thereby select at the intersection thereof, shift registers in each memory plane. The selected shift registers are shifted at high speed under control of a high-speed clock and the position of the specific selected shift registers is maintained by a current specific address counter which is stepped in unison with the shift registers. The word position address indicating the desired address of data is compared with the current specific address counter in a comparator. When a match occurs, the word position is available to the read and write circuits.

Whenever the low speed regeneration circuits indicate that is is necessary to regenerate all of the shift registers, the high speed shifting operation is interrupted and the low speed clock circuits shift all of the shift registers in unison. At the same time the current general address counter and the current specific address counter are shifted. The high-speed circuits are then allowed to regain control of the memory circuit.

After 256 bits have been read from a selected shift register, the selected shift registers are shifted at high speed until they are at the same address (as indicated by the current general address counter) as all other shift registers in the array.

DETAILED DESCRIPTION OF THE PREFERRED EMBODIMENT

Referring to FIG. 1, the auxiliary storage unit comprises a storage portion 100; X and Y address decoders 101 and 102; a control unit 103 for interfacing the storage 100 with an input/output interface; and timing circuits 104.

Figure 2:
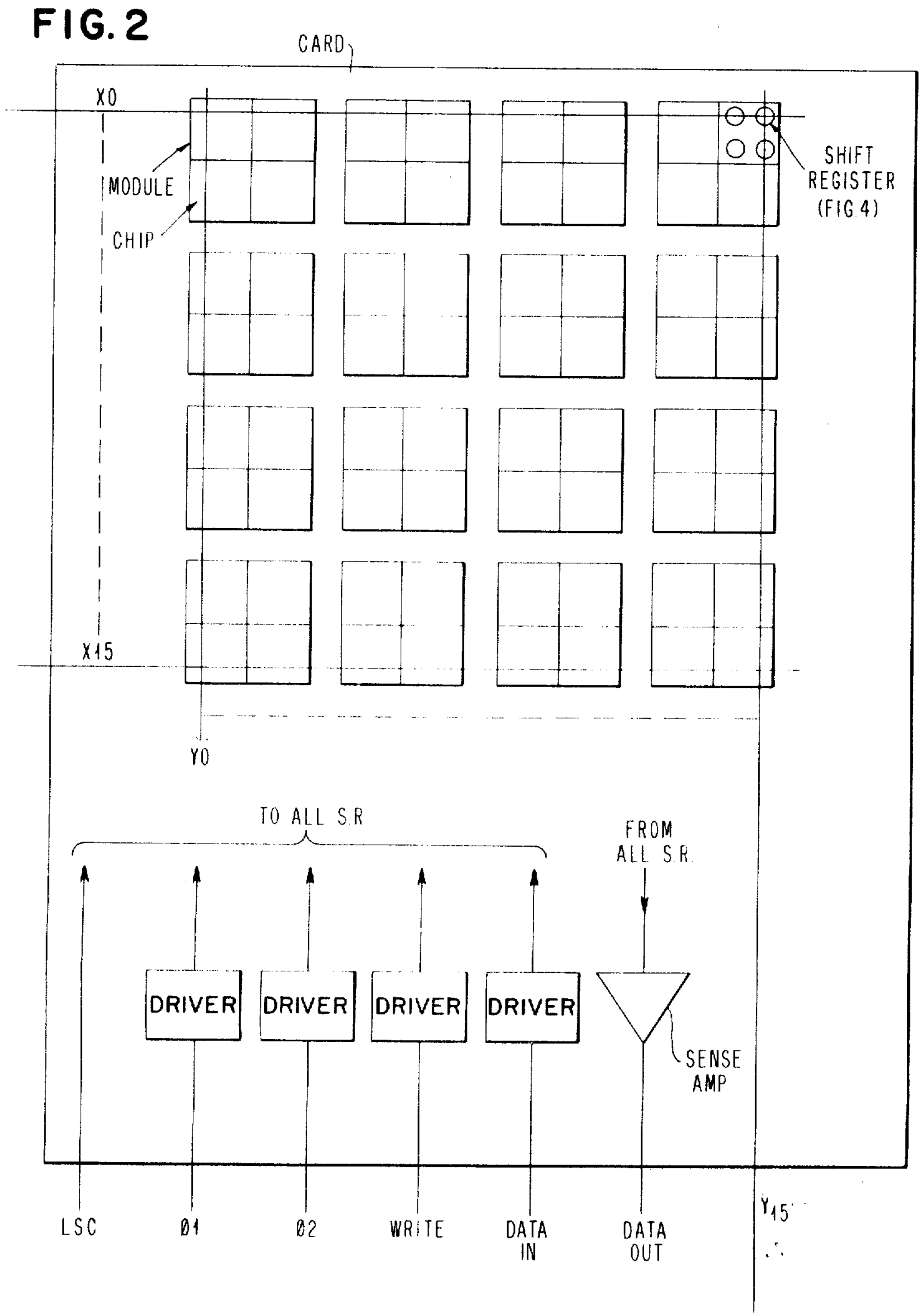
FIG. 2 is a block schematic drawing of one card of a group of cards in the storage 100 shown in FIG. 1.

The storage 100 is made up of a plurality of cards, one of which is shown in FIG. 2. In a typical memory, for example, there are 128 cards for storing data, 9 cards for error correction circuits (ECC), 4 spares, and 4 control cards.

Referring to FIG. 2, each card comprises 16 modules. Each module comprises 4 chips. There are 1,024 memory cells on each chip divided into four field effect transistor (FET) shift registers of 256 bits each. X and Y select lines X0–X15 and Y0–Y15 are provided on each card, connected in parallel through all of the cards in the storage. Thus, if $X_n$ and $Y_n$ are energized, the *m*th shift register (at the intersection of X*n*, Y*n*) on each card in the storage is energized. Driver circuits are provided for clocking lines LSC (low speed clock) phase lines $\phi$ 1, and $\phi$ 2 for driving the shift registers, a write line for energizing the shift register circuit for writing, a data in line for placing data into the shift register and a data outline for reading data from the shift register. These lines are described in more detail with respect to FIG. 4.

Figure 4:
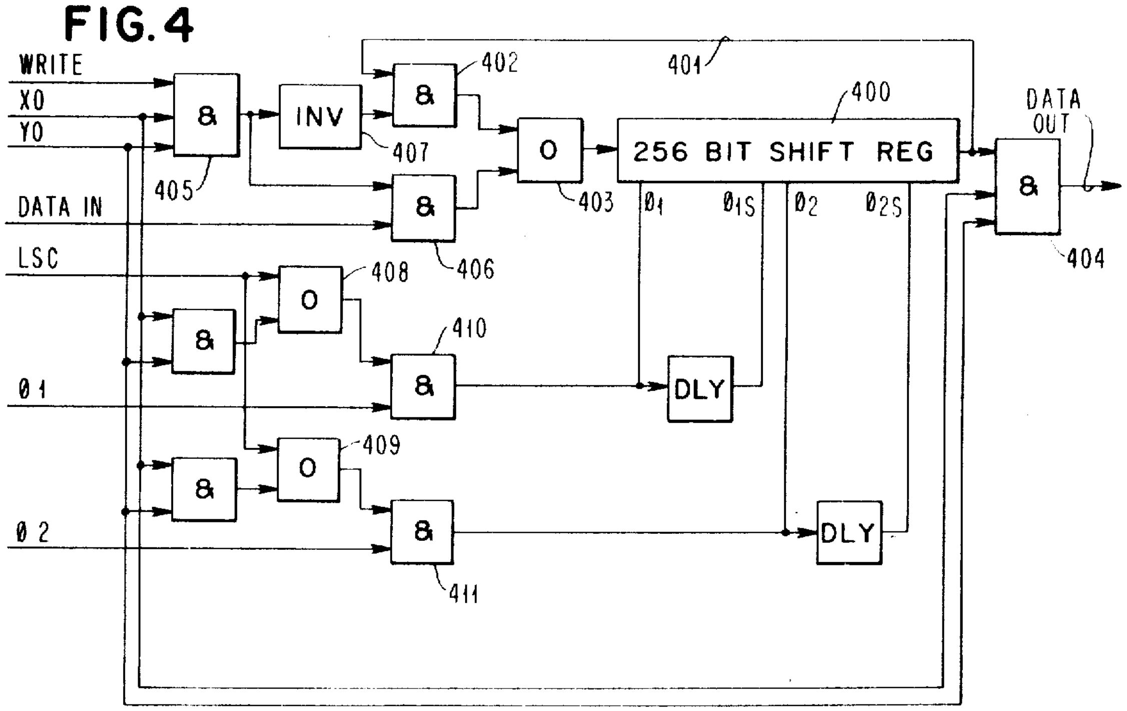
FIG. 4 is a block schematic diagram showing in more detail one of the shift registers of a matrix of shift registers shown in FIG. 2.

One shift register is shown in FIG. 4. The shift register 400 may be any one of a number of known dynamic shift registers for recirculating data. The details of such a shift register are described on page 81 of an article by R. L. Petritz entitled "Current Status of Large Scale Integration Technology," published in the 1967 Proceedings of the Fall Joint Computer Conference. The shift register comprises field effect transistors (FET) arranged to be shifted by supplying four phases, $\phi$ 1, $\phi$ 1S, $\phi$ 2, and $\phi$ 2S to the inputs of the circuit 400. In the regeneration mode or in the reading mode, the shift register output 401 is fed back through AND-circuit 402 and OR-circuit 403 to the input of the shift register 400. When it is desired to read information from the shift register, the AND-circuit 404 is energized by the X and Y select lines to cause the data on output 401 to be gated the data out line without changing the contents of the shift register. The shift register is continuously shifted by energizing the four phase lines.

When it is desired to write information into the shift register, the write line is energized thereby energizing AND-circuit 405 the output of which energizes AND-circuit 406 to allow data on the data in line to be gated through to the OR-circuit 403. The feed back line 401 is inhibited from having any effect upon the contents of the shift register by means of the inverter 407.

Because the information in an FET shift register is volatile, that is will be attenuated and eventually lost over a period of time because of the capacitive storage decay within the shift register, the information must be regenerated or shifted on a regular basis. This is accomplished by energizing the low speed clock and LSC line which through OR-circuits 408 and 409 causes the $\phi$ 1 and $\phi$ 2 lines to be gated through AND-circuits 410, 411 to the shift register to thereby cause a shift. The LSC line is described in more detail with respect to the timing circuits of FIG. 3. By means of the OR-circuits 408 and 409 the low speed clock shifts the shift register whether or not the X and Y coordinate lines are energized.

Referring to FIG. 1, a 1 megacycle oscillator 105 provides the basic timing for the storage unit. The output of the oscillator drives an AND-circuit 106 which drives a binary clock synchronization counter 107. The counter counts to 128 microseconds in order to provide for regeneration of the shift registers every 128 microseconds. The output of the clock drives a shaper 108 which is gated by the 1 megacycle oscillator at AND-circuit 109 to provide a drive for the current general address counter 110 and the current specific address counter 111. In the unselected mode, that is when the storage 100 is not selected for reading or writing, the current general address counter 110 and the current specific address counter 111 are driven in synchronism by the low speed clock trigger output 112. The select line 115 is down thereby deenergizing the switch 113 so that the output of the current general address counter 110 is presented to the comparator 114 where it is compared with the current specific address counter 111. Since the counters 110 and 111 are in synchronism, the $\overline{\text{match}}$ line 116 remains negative.

The output of the shaper 108 is inverted and drives an AND-circuit 117. The output of AND-circuit 106 also drives the AND-circuit 117. The $\overline{\text{match}}$ line and the $\overline{\text{hold}}$ line (to be described later) gate the AND-circuit 117. The output of the AND-circuit 117 is the high-speed clock trigger line which, when energized, causes the high-speed clock of FIG. 3 to provide pulses on the $\phi$ 1 and $\phi$ 2 lines to shift selected shift registers at high speed.

When the memory is not selected, the current general address counter 110 which provides an indication of the position of all nonselected registers, and the current specific address counter 111 which provides an indication of the position of only the selected registers, are advanced in unison by the low speed clock output line 112. In order to select a particular word position address, the control unit 103 presents the desired shift register address on shift register location bus and the word address on the word position address bus 118 and raises the select line 115. Through the action of switch 113 the current general address counter 110 is deselected and the word position address 118 is presented to the comparator 114. Assuming that the word position address is different from the contents of the current specific address counter, the $\overline{\text{match}}$ line 116 rises. The control unit 103 maintains the $\overline{\text{hold}}$ line 119 positive. This allows the output of the 1 megacycle oscillator 105 to be gated through AND-circuit 117 thus providing pulses on the high-speed clock (HSC) trigger line which drives the timing circuits 104 and through OR-circuit 120 to step the current specific address counter. The shift register location bus energizes the X and Y decoder drivers 101 and 102. The X decoder selects one of 16 X lines and the Y decoder selects one of 16 Y lines. The shift registers at the intersection of the energized lines are selected and are driven by the $\phi$ 1 and $\phi$ 2 lines 120 and 121 at high speed under control of the high-speed clock trigger pulse. The selected shift registers are shifted and in synchronism therewith the current specific address counter 111 is shifted to thereby maintain an indication as to the location of the selected shift registers. When the shift registers reach the address equal to the address on the word position address line 118, the $\overline{\text{match}}$ line 116 falls thereby degating the high speed clock trigger line by deenergizing the AND-circuit 117.

Sequential addressing usually takes place, therefore the control unit energizes the $\overline{\text{hold}}$ line 119 to the high-speed clock circuit thereby halting the selection at the last address. For up to 128 microseconds the low speed clock will not advance the address. When the next sequential address is received, the new word position address is placed on bus 118 and $\overline{\text{hold}}$ line 119 is released. If no low speed clock pulses occurred in the interim, only one high-speed clock pulse is necessary to bring the current specific address counter and the selected shift register up to the next sequential word position address. If, however, a low speed clock pulse did occur, then all shift registers including the selected shift registers will have been incremented one address position and therefore, no high-speed clock pulses are gated and the next word is read to the control unit.

When the desired number of words have been read or written, the select line 115 is dropped thereby returning the current general address counter output to the comparator 114. Now the current general address counter does not agree with the current specific address counter 111 and the $\overline{\text{match}}$ line 116 is therefore energized. This allows the 1 megacycle oscillator output to be gated through the AND-circuit 117 to thereby increment the selected shift registers at high speed until they are again in synchronism with all of the nonselected shift registers as indicated by a match condition between the current general address counter 110 and the current specific address counter 111. Once a match condition exists, the control unit deenergizes the shift register location bus to thereby deselect the shift register in storage 100.

Figure 3:
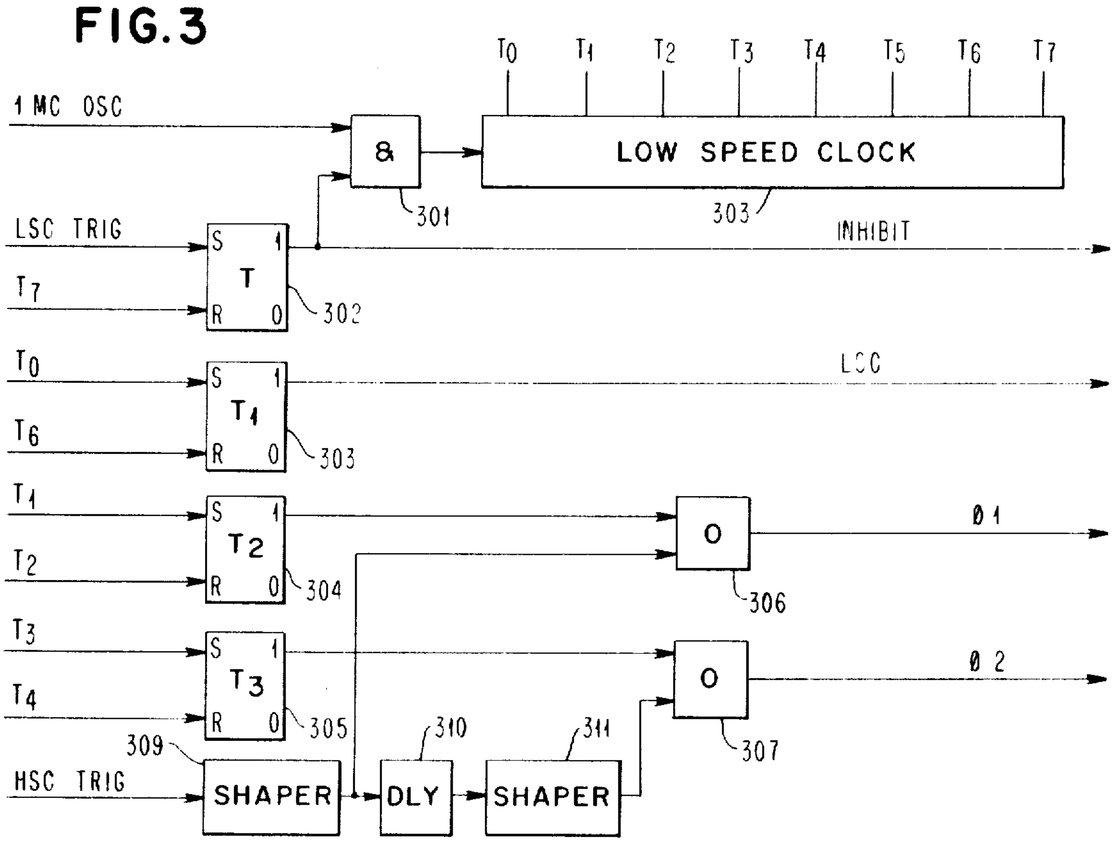
FIG. 3 is a more detailed block schematic diagram of the timing circuit 104 of the storage shown in FIG. 1.

The timing circuits 104 are shown in more detail in FIG. 3. The 1 megacycle oscillator output drives an AND-circuit 301. The other leg of the AND-circuit is energized by the low speed oscillator trigger 302 which is turned on whenever the LSC TRIG line is energized. Every 128 microseconds the clock sync counter 107 of FIG. 1 issues an LSC TRIG pulse 112 which turns on the trigger 302 of FIG. 3. The output of the trigger 302 generates an INHIBIT line which degates the AND-circuit 106 of FIG. 1 to thereby stop the clock sync counter 107 during the generation of the low speed phase pulses.

The outputs of the low speed clock 303 cause timing pulses $T_0$–$T_7$ to be generated as shown in the timing circuits of FIG. 7. Referring to FIG. 7, the LSC TRIG line goes positive after 128 pulses from the clock sync counter. This turns on the INHIBIT line which remains positive until the low speed clock has timed out to count $T_7$.

Referring to FIG. 4, at time $T_0$ the LSC line energizes the OR-circuits 408 and 409 in all of the cards (whether or not the X and Y lines for a particular shift register are energized) to thereby permit the phase 1 ($\phi$1) and phase 2 ($\phi$2) pulses to pass through the AND-circuits 410 and 411. The phase 1 and phase 2 pulses 701, 702 of FIG. 7 are longer in duration than the phase 1 and phase 2 pulses (703, 704) of the high-speed clock because the powering of so many circuits requires a longer pulse. The low speed clock trigger 303 (FIG. 3) is turned on at time $T_0$ and off at time $T_6$ to thereby gate the pulses 701 and 702 (FIG. 7). The phase 1 and phase 2 pulses for low speed operation are controlled by triggers 304 and 305 (FIG. 3). The outputs of triggers 304 and 305 pass through OR-circuit 306 and 307 to thereby energize the $\phi$1 and $\phi$2 lines. Since during the operation of the low speed clock, the INHIBIT line is energized, the HSC TRIG line remains negative during the low speed clock operation.

During high-speed clock operations, the HSC TRIG line drives a shaper 309 which produces a very narrow pulse (703 of FIG. 7) which passes through the OR-circuit 306 to the $\phi$1 line. The output of the shaper 309 is delayed by delay circuit 310, and is shaped by shaper 311, the output of which passes through OR-circuit 307 to produce a pulse (704 of FIG. 7) on the $\phi$2 line. When the current specific address counter reaches the desired address the $\overline{\text{match}}$ line falls. Since sequential addressing is usually the case, the control unit 103 drops $\overline{\text{hold}}$ to thereby stop the selection at the last address. When the next sequential address has been received (for example, by incrementing the position register) the hold is released.

Referring to FIG. 8, an example of a typical sequence of operation of the specific address counter and the general address counter is illustrated. In this example the desired word address placed on the WORD POSITION ADDRESS BUS 118 is arbitrarily taken as 102. Ten words are to be transferred beginning at the address 102 and ending at address 111. Initially both the specific address counter and the general address counter are at the same address, for example, 401. Every 128 microseconds the low speed clock shifts both counters in synchronism and all shift registers in order to regenerate the information stored therein.

At the point 800 in the diagram of FIG. 8 the select line is made positive (the $\overline{\text{hold}}$ line is positive) thereby causing the high-speed clock to advance selected shift registers at high speed to the desired address. The desired address placed on the word position address bus in our example is the address 102. The specific address counter is advanced until it reaches the point 801 at which the contents of the specific address counter equals the desired address 102. The controls now step the specific address counter and the selected shift registers in synchronism to read or write the 10 words. After 10 words have been transferred in synchronism with the using device, (point 803 in the diagram) the selected shift registers are restored to synchronism with the general address counter by dropping the select line which causes HSC TRIG to shift the selected shift registers until the specific address counter compares with the general address counter at point 804. In the example of FIG. 8, a low speed clock pulse is shown occurring at the point 805. At this point the high-speed clock operation is interrupted while a low speed clock shift operation occurs. This causes the general address counter to be shifted to address 402. Of course, the specific address counter is also shifted one location because all shift registers, including selected ones, are shifted. At the conclusion of the low speed clock operation, the high-speed clock again takes over and continues the restoration of the specific address counter to the point 804 when the specific address counter compares with the general address counter. The high-speed clock operation is concluded at this point and the specific address counter is stepped under control of the low speed clock every 128 microseconds.

Figure 5:
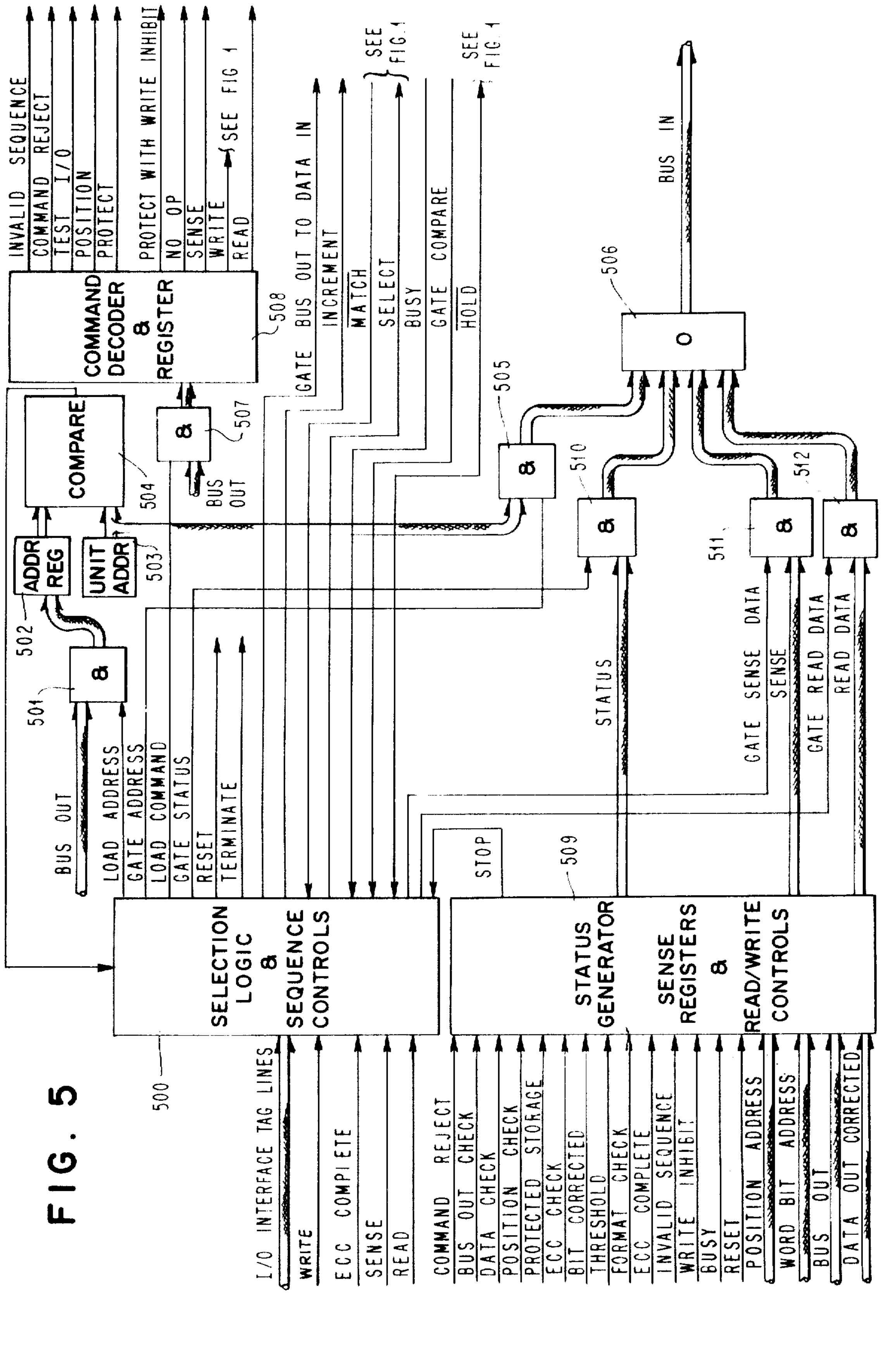
FIG. 5 is a block schematic diagram showing in more detail some of the logic circuits of the control unit 103 of FIG. 1.
Figure 6:
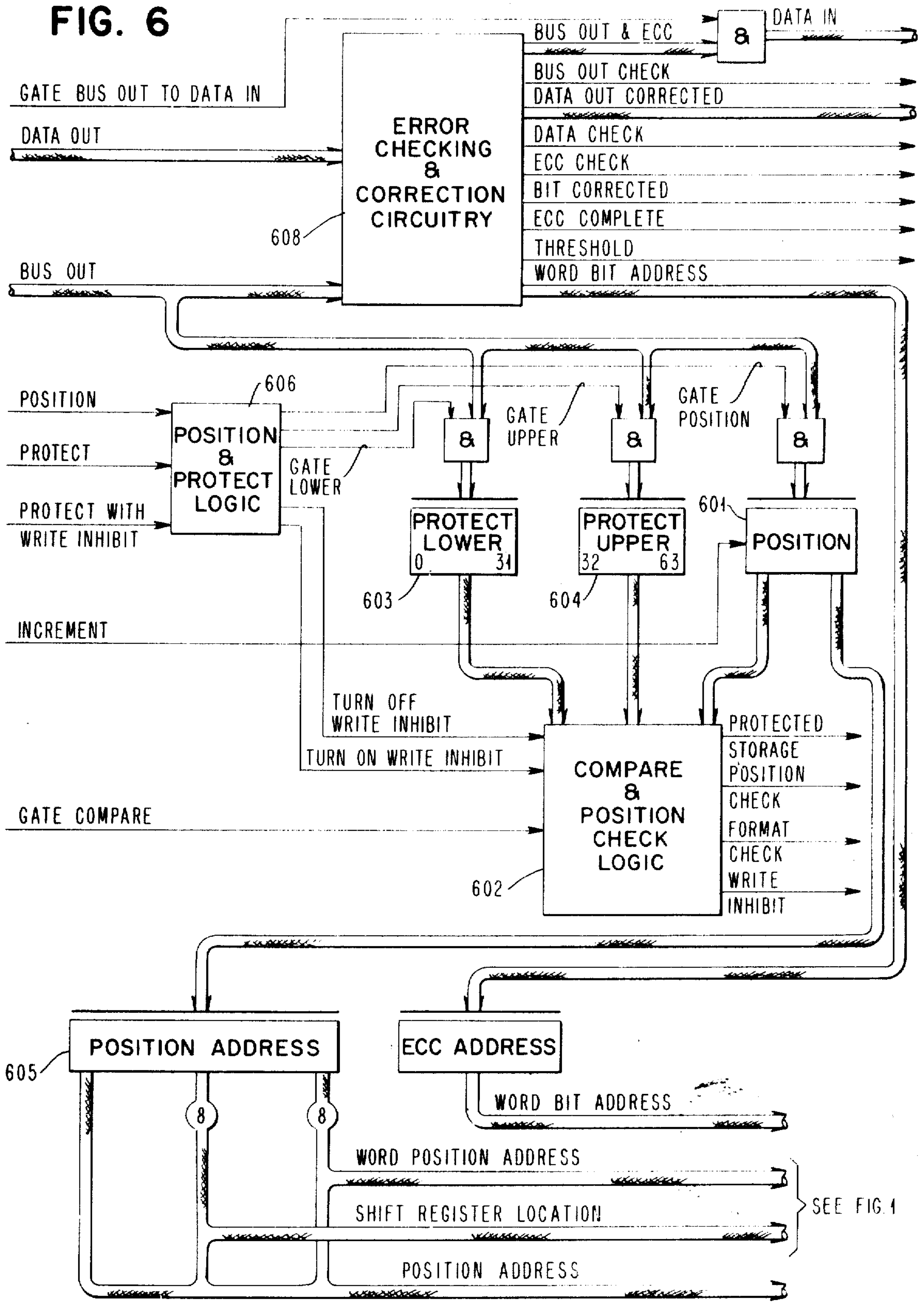
FIG. 6 is a block schematic diagram showing in more detail the remainder of the control circuits of the control unit 103 of FIG. 1.

The control unit 103 of FIG. 1 is shown in more detail in FIGS. 5 and 6. This control unit operates under the control of an input/output data channel which communicates with the control unit over an I/O interface 500. An example of such an interface is shown in U.S. Pat. No. 3,336,582, Interlocked Communication System, to W. F. Beausoleil et al., filed Sept. 1, 1964 and issued Aug. 15, 1967. The present invention is not, however, limited to such an interface. For example, the storage unit may operate directly with a main memory interface through an integrated channel.

The selection logic and sequence controls 500 respond to and generate I/O interface tag lines of the type described in the above identified patent.

CONTROL OF INPUT/OUTPUT OPERATIONS

The central processing unit controls the auxiliary storage unit in a manner similar to that described in IBM System/360 Principles of Operation, form number A22–6821–5 for the control of input/output operations. The auxiliary storage unit controls are controlled over the interface by a data channel. Operations on the data channel are initiated by the CPU program which issues a START I/O instruction. The instruction causes the channel to fetch the channel address word (CAW) from a fixed location in main storage. The CAW contains the indirect address of a location in main storage from which the channel subsequentially fetches the first channel command word (CCW). The CCW is a channel instruction and specifies the command to be executed and the storage area in main memory to or from which the data is to be transferred. The I/O operation may involve transfer of data to one storage area, comprising a block of data words designated by a single CCW, or to a number of blocks of storage areas chained together by means of chaining CCWs.

Two operands are involved in each data transfer. The main storage operand is associated with a read or write command and its location and extent are defined by a data field specified by the CCWs. The auxiliary storage operand designates the data in the auxiliary storage unit. The location of the data may be stated explicitly by defining a starting address on the device, or the location may be implied by using the current auxiliary storage address of the device as the starting point. The length of the auxiliary storage operand is determined by the length of the main storage operand. Protection is provided for both operands as set forth in the IBM System/360 Principles of Operation cited above.

The information specifying the location of the auxiliary storage operand is referred to as the position of the auxiliary storage control unit. The position address is transferred to the control unit by a control command. The control information is designated by the data address contained in the CCW and the length is designated by the count field of the CCW. A control command specifying the order "position" and defining a starting position address is used to initiate positioning of the auxiliary storage control unit.

The main storage operand is controlled directly by the channel and is specified by the CCWs. The main storage operand field consists of the main storage block designated by the CCW or a chain of CCWs associated with a read or write command.

Main storage protection and device storage protection are provided and are discussed in more detail with respect to FIG. 6.

When controlling data transfer, the amount of data transferred during a read or write operation is controlled by the CCWs associated with the read or write command. As the read or write operation is executed, the position address in the auxiliary storage control unit (FIG. 6) is incremented. This controls the address of the auxiliary storage. The addressing of the main storage is controlled by the address field of the CCW. The count field of the CCW maintains a count of the number of bytes transferred. When the count of the last CCW in a chain of CCWs is exhausted, data transfer is terminated, channel end and device end status conditions are generated and a program interruption occurs.

The auxiliary storage control unit executes read, write, control, sense, and test I/O commands. Commands are transferred to the control unit under control of the I/O interface. The selection logic 500 (FIG. 5) generates a LOAD COMMAND which energizes AND-circuit 507. This places the command received on BUS OUT into the command decoder and register 508. Each command performs the following functions.

Write Command

The write command causes data to be transferred from the main storage operand field designated by the CCW to the auxiliary storage operand field identified by the position address. The amount of data transferred is under control of the count field in conjunction with the chain data flag of the CCW.

Read Command

The read command causes data to be transferred from the auxiliary storage operand field designated by the current position address to the main storage operand field designated by the CCW. As in a write command, the amount of data transferred is under control of the count field in conjunction with the chain data flag of the CCW.

Control Command

The control command specifies one of four control orders: no operation, position, protect, and protect with write inhibit.

A control command specifying NO OPERATION causes no action at the auxiliary storage unit and causes no data to be transferred. The current position address and the protection addresses in the auxiliary storage unit are not changed.

A control command specifying POSITION causes the auxiliary storage unit to request four bytes of control information. This control information is the position address, bit positions 0–31, which are stored in the position register 601 (FIG. 6) of the auxiliary storage unit. When the transfer is complete, channel end and device end are signalled. If less than four bytes are transmitted, unit check is indicated with channel end and device end in the status byte, and format check is generated at logic circuit 602 (FIG. 6) to provide sense information.

A control command specifying PROTECT causes the position and protect logic 606 (FIG. 6) to turn off the write inhibit indicator in the compare and position check logic 602 and to request eight bytes of control information. This information is the upper and lower address fields which specify address boundaries on the unprotected auxiliary storage unit area between which data can be accessed. The first two bytes are set into the protect lower register 603 and the remaining two bytes are set into the protect upper register 604. If the lower address field is larger than the upper address field, the protected area extends from the lower address to the upper address. If the addresses are equal, all auxiliary storage is protected.

A PROTECT order is issued only once in a chain of commands. If such an order is issued when a previous order is in effect, in the same chain of commands, the operation is terminated with unit check presented and the command reject and invalid sequence sense bits set. The upper and lower address registers 603, 604 remain unchanged.

Read or write commands attempting to access data not within the limits specified by the protect order cause the operation to be terminated with unit check, channel end and device end set in the status byte. Protected storage is turned on at the sense register 509 (FIG. 5).

The PROTECT WITH WRITE INHIBIT order causes the logic 606 to turn on the write inhibit indicator in logic 602 associated with the protection registers of FIG. 6 and to request eight bytes of control information. The operation is similar to the protect operation above except that in addition to read and write protection in the protected area, any attempt to write in the unprotected area of the device causes unit check to be turned on in the status byte and write inhibit and protected storage to be set at the sense registers 509.

A protect with write inhibit order issued during command chaining while a previously issued protection order is in effect causes the operation to be terminated with unit check presented in the status byte and command reject and invalid sequence bits set in the sense data registers 509.

Sense Command

The sense command causes eight bytes of sense data stored in register 509 to be placed on BUS IN and transferred from the auxiliary storage to the channel. Execution of the sense command does not affect the current position address in the auxiliary storage. The following sense bits are provided in the sense data:

Command reject—indicates that the device detected an undefined command or a command was issued in an invalid sequence, for example, when protect is issued while a previous protect is in effect.

Bus out check–indicates that the device detected an invalid interface sequence or parity error in the data or command byte.

Equipment check—indicates that the device detected equipment malfunctioning during the last operation.

Data check—indicates that the device detected a data error other than those errors included in bus out check.

Position check—indicates that the device detected an attempt to read or write at an invalid position address.

Protected storage—indicates that the device detected an attempt to communicate with a protected position on the auxiliary storage.

ECC check—indicates that the device detected an uncorrectable error. Data check is also set.

Bit corrected—indicates that a bit in the error was corrected.

Threshold—indicates that the *n*th correctable error was detected since the last sense operation. A counter in the error checking and correction circuitry 608 (FIG. 6) maintains the error count.

Format check—indicates that the device did not receive the prescribed number of bytes associated with a position or protection order.

Invalid sequence—indicates that the device detected a second protection order during a command chaining operation. Command reject is also set.

Write inhibit—indicates that the device detected an attempt to write in the unprotected area of storage while the write inhibit indicator was turned on in the logic 602 of (FIG. 6). Protected storage is also set.

Position address—this bus contains the current position address.

I/O Interface

The I/O interface as described in the above-identified Beausoleil et al. patent is a sequential interlocked interface which includes three basic operations: initial selection sequence, data transfers, and ending sequences. The sequences are either initiated by the channel or the control unit.

Initial Selection Sequence

To initiate an input/output operation, the channel places the address of the desired I/O device on BUS OUT and raises an ADDRESS OUT interface tag line. The selection logic and sequence controls 500 (FIG. 5) respond with a signal LOAD ADDRESS which gates the address on BUS OUT through AND-circuit 501 to the address register 502. The device address is permanently wired into the unit address register 503. The two addresses are compared in the compare circuit 504 and a compare signal indicates to the controls 500 that the device has been selected. The selection controls 500 respond by gating the unit address 503 through AND-circuit 505 and OR-circuit 506 to BUS IN which is connected to the channel. This is accomplished by following the appropriate interface sequences. The channel checks the address, and responds by placing a command on BUS OUT and signalling over the I/O interface. The controls 500 respond with LOAD COMMAND which gates the command on BUS OUT through AND-circuit 507 to the command decoder and register 508. The control unit then places the status information stored in the controls 509 onto BUS IN by raising GATE STATUS which gates the status information through AND-circuit 510 to BUS IN. If the channel accepts this status condition, it signals over the I/O interface and this completes the initial selection sequence. Busy status is presented to the channel if this I/O device has already been selected.

Data Transfers

The I/O operation to be executed over the interface is determined by decoding a command issued to the I/O device during a channel initiated selection sequence. Prior to issuing a write or a read command, it is necessary to issue a control command. The bits received by the control unit from the control command are decoded to determine which of several possible functions is to be performed. The first control command is a PROTECT command or a PROTECT WITH WRITE INHIBIT (which allows a read only operation). These commands cause eight bytes of data to be transferred across the interface, four bytes placed in the protect lower register 603 and four bytes placed in the protect upper register 604 (FIG. 6). Therefore, data can be written into or read from addresses only between the limits of the protect lower and the protect upper registers.

The PROTECT WITH WRITE INHIBIT command is similar to the PROTECT command except that it also turns on the write inhibit trigger located within the logic 602. This assures that the protected locations will only be read from and not written into.

The PROTECT control command is followed by another control command called POSITION. This command causes the position address to be stored in the position register 601 to identify the location of the data in the storage 100 of FIG. 1. The position register 601 is compared in the compare circuit 602 with the protect lower 603 and protect upper 604 register to assure that the address is an unprotected address. If the position address is not within the boundaries specified, then the POSITION CHECK line is made positive to indicate this fact.

The control command is chained to a READ or WRITE command. Assume that a read operation is to take place. At the end of the position control command, the channel, after going through the initial selection sequence, loads the READ command into the command decoder and register 508. The READ command is decoded which causes the controls 500 to issue signals to select the appropriate shift registers in the storage 100 indicated by the position address 601 (FIG. 6). This is accomplished by raising the SELECT line. This line causes the WORD POSITION ADDRESS (FIG. 6) to be gated through the switch 113 (FIG. 1) to the comparator 114. The appropriate shift registers in the storage 100 are selected by means of the X and Y coordinates as decoded by the decoders 100 and 102 from the SHIFT REGISTER LOCATION bus from the position address register 605. The $\overline{\text{MATCH}}$ line 116 is positive until the word position address and the current specific address counter are equal. This causes the HSC TRIG line to be gated through the AND-circuit 117 to the timing circuits 104 to thereby cause the selected shift registers and the current specific address counter 111 to be shifted at high speed until the location is equal to the word position address. The information at the desired address appears on the data out line and is stored in a register in the read/write controls of 509 (FIG. 5). The selection logic and sequence controls 500 issue a GATE READ DATA signal which gates the read data to BUS IN through AND-circuit 512. The controls 500 also energize the $\overline{\text{HOLD}}$ line to prevent further high-speed clock pulses from passing through the AND-circuit 117.

After the read data has been stored in a register in controls 509, the control unit initiates a selection sequence on the I/O interface to again establish communication with the channel. After communication has been established, the control unit requests data transfer by gating the read data to BUS IN and raising the appropriate I/O interface tag line to indicate to the channel that BUS IN is valid. In the embodiment shown, 16 bytes of data are read broadside from the storage 100. If BUS IN will handle only one byte, then 16 bytes are gated sequentially from the register 509 over the I/O interface. This is known as burst mode operation and is accomplished as described in the above identified Beausoleil et al. patent. During this transfer, the $\overline{\text{HOLD}}$ line remains negative. At the end of a transfer of 16 bytes, the control circuit 500 energizes the INCREMENT line to increment the position register 601 one address position. The control unit releases the $\overline{\text{HOLD}}$ line which allows the shift register to be shifted to the next sequential position and thereby read the next 16 bytes into the registers 509.

End Sequence

At the end of the read operation, the channel signals stop across the I/O interface and the selection logic 100 issues a terminate signal which terminates the operation of the control unit. This causes the SELECT line to be deenergized and the current general address counter and the selected shift registers to be shifted at high speed until the current general address counter equals the current specific address counter.

The position register 601 is incremented by the controls 500 after each word is read from the storage. If the position register goes outside the limits of the protect lower and protect upper registers, an output "protected storage" occurs from the compare circuit 602 and the operation is terminated.

Figure 9:
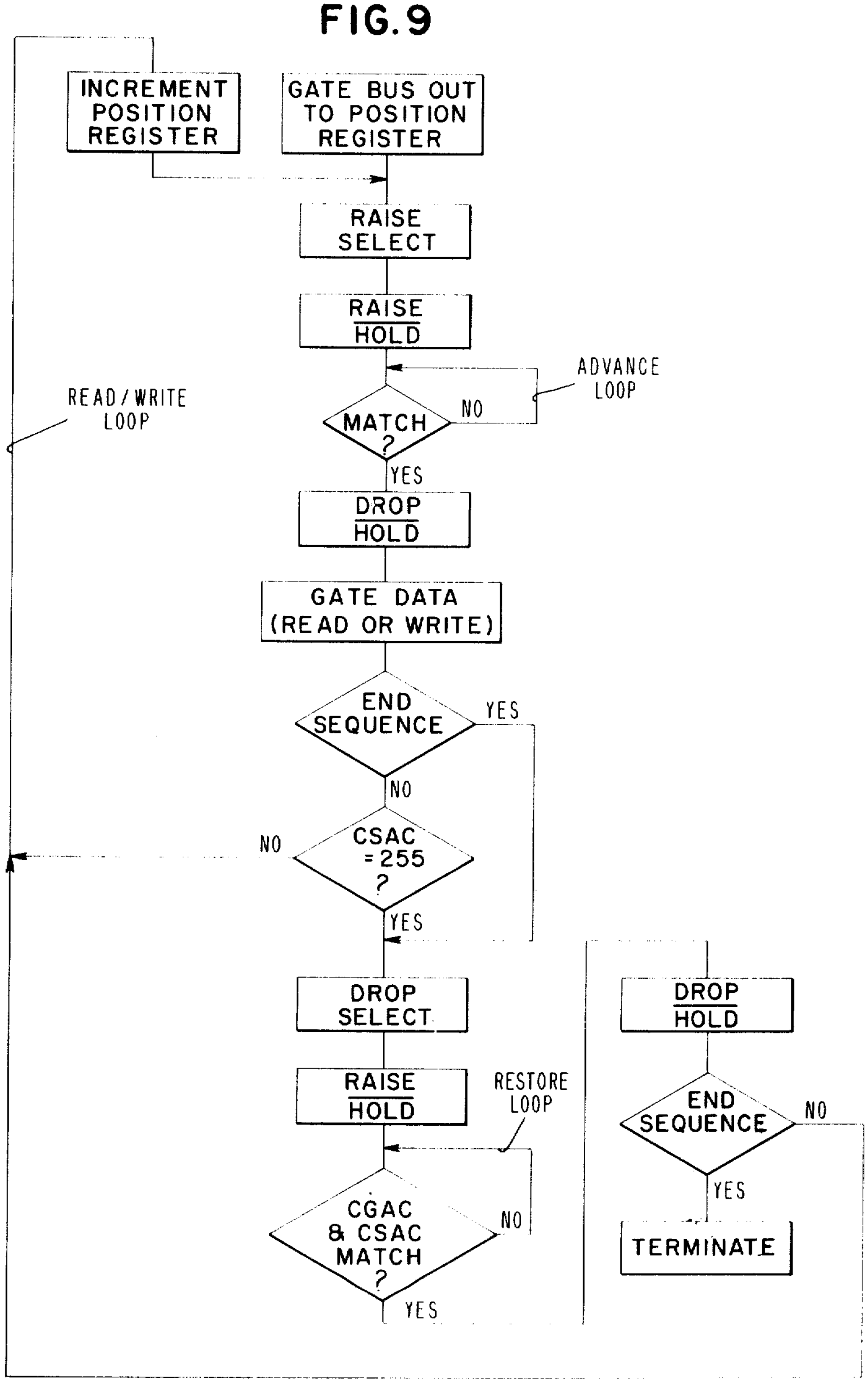

An abbreviated flow diagram of a typical operation involving the sequential selection of shift registers is shown in FIG. 9. The diagram starts from the point at which, in response to the position command, the position and protect logic 606 (FIG. 6) gates BUS OUT to the position register 601. The next step in the flow chart is raise select, in which the selection logic 500 (FIG. 5) raises the select line thereby causing the word position address to be gated through the switch 113 to the comparator 114 (FIG. 1). Next, the selection logic raises the $\overline{\text{hold}}$ line. If no match occurs, the $\overline{\text{match}}$ line from the comparator 114 causes the AND 117 to be energized to thereby allow the shift registers to advance at high speed until a match occurs (advance loop). When a match occurs, the selection logic and sequence controls respond by dropping $\overline{\text{hold}}$ after which gate data (read or write) occurs. This is accomplished by either raising the gate bus out to data in line or the gate read data line (FIG. 5). The gate bus out to data in line gates the write data on bus out to the data in lines of the memory (FIG. 6). The gate read data line energizes AND-circuit 512 (FIG. 5) to thereby cause the read data from a register 509 to be gated to bus in via OR-circuit 506.

The next step in the flow chart of FIG. 9 is to test for an end sequence at the I/O interface. If an end sequence is not present, the controls test to determine if the current specific address counter has reached 255, which is the end of the data stored in the selected shift registers. If no, the selection logic issues an increment signal which increments the position register 601 (FIG. 6). The read/write loop is repeated as described above until either an end sequence does occur or the current specific address counter is equal to 255. In either event, the sequence controls 500 drop select, to thereby cause the current general address counter 110 to be compared with the current specific address counter 111. Next, the controls raise hold causing the shift registers to shift at a high speed in the restore loop until the current general address counter and current specific address counter match. When this occurs, the selected shift registers have been restored to the same general address as all of the other shift registers in the array. At this point the two counters match and the sequence controls drop hold.

If an end sequence has been signalled at the interface, the controls enter the read/write loop. In the read/write loop the first step is to increment the position register to thereby step to the next sequential address. This causes the next sequential group of shift registers to be selected by means of the shift register location bus and the read/write sequence described above is repeated. The operation continues until an end sequence occurs.

While the invention has been particularly shown and described with reference to a preferred embodiment thereof, it will be understood by those skilled in the art that various changes in form and details may be made therein without departing from the spirit and scope of the invention.

What is claimed is:

1. A memory for storing data at a position address, said data accessible by presenting a position address to said memory, comprising:

a plurality of memory elements having data bits stored therein;

addressing means for decoding said position address and for energizing at least one memory element;

means for electronically rotating data bits in said energized memory element and for maintaining a specific address indicating the electronic position of said bits in said element; and means for comparing said specific address indicating the electronic position of said bits with said position address to thereby indicate that said bits stored in said energized memory element have been electronically rotated to the word address indicated by said position address.

2. The combination according to claim 1 wherein said memory elements are of the type which require periodic low speed regeneration to maintain the data stored therein;

means for periodically regenerating said memory elements; and means responsive to said regeneration means for inhibiting said means for electronically rotating data bits in said energized memory element for the duration of said regeneration.

3. The combination according to claim 2 wherein said regeneration means includes means for electronically rotating data bits in said memory elements at least one bit position to thereby regenerate the data stored therein; and means for maintaining a general address indicating the electronic position of data bits in unenergized memory elements, independently of said means for maintaining a specific address indicating the electronic position of data bits in said energized memory element.

4. A memory for storing data at a position address, said data accessible by presenting a position address to said memory, comprising:

a plurality of memory elements in which data bits are electronically rotatable arranged in columns and rows;

X–Y addressing means for decoding said position address and for energizing at least one X and one Y coordinate to select a memory element at the intersection thereof;

means for electronically rotating data bits in said selected memory element and for maintaining a specific address indicating the electronic position of said bits; and means for comparing said specific address with said position address to thereby indicate that said bits in said selected memory element have been electronically rotated to the word address indicated by said position address.

5. The combination according to claim 4 wherein said memory elements are of the type which require periodic low speed regeneration to maintain the data stored therein;

means for periodically regenerating data stored in said memory elements; and means responsive to said regeneration means for inhibiting said means for electronically rotating said data bits stored in selected memory element for the duration of said regeneration.

6. The combination according to claim 5 wherein said regenerating means includes means for electronically rotating data bits stored in said memory elements at least one bit position to thereby regenerate the data stored therein; and means for maintaining a general address indicating the electronic position of data in all unselected memory elements, independently of said means for maintaining a specific address indicating the electronic position of said data bits in said selected memory element.

7. A memory for storing data at a position address, said data accessible by presenting a position address to said memory, comprising:

a plurality of shift registers arranged in columns and rows;

X–Y addressing means for decoding said position address and for energizing at least one X and one Y coordinate to select a shift register at the intersection thereof;

means for shifting data stored in said selected shift register and for maintaining a specific address indicating the electronic position of said data; and means for comparing said specific address with said position address to thereby indicate that said data in said selected shift register has been shifted to the word address indicated by said position address.

8. The combination according to claim 7 wherein said shift registers comprise field effect transistors, connected as a dynamic shift register wherein data is stored and transferred by charging and discharging stray capacitance.

9. The combination according to claim 7 wherein said shift registers are of the type which require periodic low speed regeneration to maintain the data stored therein;

means for periodically regenerating all of said shift registers; and means responsive to said regeneration means for inhibiting said means for shifting for the duration of said regeneration.

10. The combination according to claim 9 wherein said regeneration means includes means for shifting all of said shift registers at least one bit position to thereby regenerate the data stored therein; and means for maintaining a general address indicating the electronic position of data in all unselected shift registers, independently of said means for maintaining a specific address indicating the electronic position of said selected memory element.

11. A storage device comprising:

a memory element in which bits stored therein are electronically rotatable;

timing means including means for electronically rotating said bits in said memory element and means for maintaining a first address indicating the electronic position of said bits;

data access control means for presenting to said timing means a second address representing data to be accessed in said memory element; and means responsive to said second address for energizing said timing means to thereby cause said bits stored in said memory element to be electronically rotated.

12. The combination according to claim 11 including means for comparing said first address and said second address; and means responsive to said comparison means for deenergizing said timing means.

13. The combination according to claim 11 wherein data stored in said memory element is regenerated periodically, and wherein said timing means comprises a relatively high-speed timing circuit for electronically rotating the data in said memory elements at high speed for data access, and a relatively low speed timing circuit for periodically regenerating the data stored in said memory element.

14. The combination according to claim 13 wherein said timing means includes means for inhibiting said high-speed timing circuit whenever the data in said memory element is being regenerated.

15. The combination according to claim 11 including means for comparing said first address to said second address.

16. For use in an electronically rotatable bulk memory storage, a memory access control circuit comprising:

a source of timing pulses;

first means responsive to said timing pulses for producing high-speed pulses;

second means responsive to said high-speed pulses for producing low speed pulses;

current general address counter means responsive to said low speed pulses;

third means energized upon the coincidence of energization of said high-speed pulses, a $\overline{\text{hold}}$ line, and a $\overline{\text{match}}$ line;

current specific address counter means responsive to said low speed pulses or said high-speed pulses from the output of said third means;

comparing means having a first input and a second input for comparing said first and second inputs to thereby deenergize said $\overline{\text{match}}$ line;

a word position bus;

means for selectively either connecting said current general address counter or said word position bus to said first input of said comparing means; and means connecting the output of said current specific address counter to said second input of said comparing means.

17. The combination according to claim 16 further including control means for controlling energization of said current specific address counter by said high-speed pulses by deenergizing said $\overline{\text{hold}}$ line, incrementing said word position address and energizing said $\overline{\text{hold}}$ line.

18. The combination according to claim 16 further including timing means responsive to said high-speed pulses and said low speed pulses for controlling the bulk memory and means for generating an inhibit line for deenergizing said high-speed pulses during the period of time that said low speed clock pulses occur.

19. The combination according to claim 18 including control means operable to connect said timing means to an interface over which requests for data are received; and means in said control means responsive to a request to provide a word position address to said word position address bus; and, means in said control means for energizing said $\overline{\text{hold}}$ line.

20. For use in an electronically rotatable bulk memory storage, a memory access control circuit comprising:

a source of timing pulses;

an AND circuit responsive to said timing pulses for producing high-speed pulses;

a clock sync counter responsive to said high-speed pulses for frequency dividing said pulses to produce low speed trigger pulses;

a current general address counter responsive to said low speed trigger pulses;

an AND circuit for generating high speed trigger pulses in response to energization by the coincidence of energization of said high-speed pulse, a $\overline{\text{hold}}$ line, and a $\overline{\text{match}}$ line;

a current specific address counter incremented by energization of an OR energized by either said low speed trigger pulses or said high speed trigger pulses from the output of said AND circuit;

a comparator having a first input and a second input for comparing said first and second inputs to thereby deenergize said $\overline{\text{match}}$ line;

a word position bus;

switch means for selectively either connecting said current general address counter or said word position bus to said first input of said comparator; and means connecting the output of said current specific address counter to said second input of said comparator;

whereby when said select line is energized said output of said current general address counter is disconnected and said word position address bus is connected to said comparator;

and whereby said current general address counter and said current specific address counter are stepped in synchronism under the control of only low speed trigger pulses upon the condition that said select line is deenergized, and upon the condition that the said counters compare so that said $\overline{\text{match}}$ line is disenergized; and said current specific address counter is stepped under control of said high speed trigger pulses upon the condition that said select line and said $\overline{\text{match}}$ line are energized.

21. The combination according to claim 20 wherein said control circuit includes means for controlling the shifting of said current specific address counter by said high-speed clock trigger line by disenergizing said $\overline{\text{hold}}$ line, incrementing said word position address and energizing said $\overline{\text{hold}}$ line.

22. The combination according to claim 20 wherein said timing circuits include means responsive to said high speed clock trigger and said low speed clock trigger for controlling the bulk storage and means for generating an inhibit line for deenergizing said high-speed pulses during the period of time that said low speed clock circuit is operating.

23. The combination according to claim 20 including control means operable to connect said timing means to an interface over which requests for data are received;

means in said control means responsive to a request to provide a word position address to said word position address bus; and, means in said control means for energizing said $\overline{\text{hold}}$ line.

24. The method of controlling a bulk memory of the type in which data are stored in memory elements in which data are rotatable comprising the steps of:

rotating data stored in a set of said elements at low speed to thereby sustain data stored therein;

selecting a subset of memory elements within said set; and electronically rotating data in said selected elements at a rate which is independent of the rate necessary to sustain data stored in said memory; and, transferring data to or from said selected memory elements.

25. The method of claim 24 comprising the further steps of data in inhibiting the independent rotation of said selected memory elements during the time that said low speed rotation is in progress.

26. The method of controlling a bulk memory of the type in which data are stored in memory elements in which data are electronically rotatable comprising the steps of:

rotating data in a set of said elements at low speed to thereby regenerate data stored therein;

selecting a subset of memory elements within said set;

electronically rotating data in said selected subset of memory elements at high speed; and, reading or writing data in said selected subset of memory elements at a rate which is greater than the rate necessary to sustain data stored in said memory.

27. The method of claim 26 comprising the further step of inhibiting the high-speed rotation of said data in said memory elements during the time that said low speed regeneration is in progress.

28. For use in a bulk memory system:

a memory element having data bits stored therein, which bits are capable of being shifted in a loop by phased clock outputs at either a first rate or a second rate depending upon the pulse rate of said phased clock outputs;

means for selecting said memory element; first rate control means within said element responsive to said selecting means, for gating said phased outputs to thereby permit said phased outputs to electronically rotate said bits stored in said memory element at a first rate; and second rate control means energizable to permit said phased outputs to electronically shift data bits in said memory element independently of the energization or deenergization of said selecting means.

29. For use in a bulk memory system;

an electronically rotatable memory element having data bits stored therein, which bits are capable of being shifted in a loop by phased clock outputs at either a first rate or a second rate depending upon the pulse rate of said phased clock outputs;

means including X and Y lines for selecting said memory element;

circuits within said element for gating said phased outputs to thereby permit signals on said phased outputs to electronically rotate data bits in said memory element;

and low speed control means energizable to permit said phased outputs to electronically rotate data in said memory element independently of the energization or deenergization of said X and Y lines.

30. Auxiliary storage apparatus comprising:

a plurality of multibit memory elements in which data bits stored therein are electronically rotatable, said elements arranged in columns and rows in memory planes, one plane for each bit position of a word;

address decoding means for selecting a column and a row to thereby select one memory element location on each plane;

means for electronically rotating the bits in the selected memory elements in unison to thereby read or write words in parallel, each bit of a word being read or written from a corresponding memory plane;

means for maintaining a position count of the contents of the memory elements as they are rotated; and means for comparing the address of a particular word with said position count, such that when the two compare, the word corresponding to the word position address is accessible at the selected memory elements.

31. The combination according to claim 30 wherein a characteristic of the memory elements is that data are stored therein on a temporary basis and must be regenerated periodically, said apparatus further comprising:

timing means including a high-speed clock operating in conjunction with a low speed clock;

means for selecting a particular memory element within a group of elements including means for rotating the bits in the selected elements at a high speed under control of the high-speed clock and means for regenerating the data stored in the remainder of the elements at slow speed by the low speed clock.

32. The combination according to claim 31 including control means for presenting the word position address of the first word of a block of words to said comparing means so that the bits in the selected memory elements are electronically rotated at high speed until the position count matches the word position address;

means for halting the rotation; and means for accessing successive words by incrementing the word position address and electronically rotating the bits in the selected memory elements one word position at a time.

33. The method of controlling a memory including a plurality of multibit memory elements in which data bits stored therein are electronically rotatable, said elements arranged in columns and rows in memory planes, one plane for each bit position of a word, including address decoding means for selecting a column and a row to thereby select one memory element location on each plane, with further means for electronically rotating the data bits stored in the selected memory elements in unison to thereby read out words in parallel, each bit of a word being read out from a corresponding memory plane, comprising the steps of:

maintaining a position count of the contents of the memory elements as the data bits are rotated; and locating a particular word by comparing the address of the particular word with the state of the position counter;

whereby when the two compare, the word corresponding to the word address appears at the output of the selected memory elements.

34. The method of claim 33 further comprising the steps of:

comparing the word position address of the first word of a block of words with said position count;

electronically rotating data in the selected memory elements at high speed until the position count matches the word position address; and accessing successive words by incrementing the word position address and electronically rotating data in the selected memory elements one word position at a time.

* * * * *